United States Patent [19]
Grinberg et al.

[11] 4,124,278
[45] Nov. 7, 1978

[54] OPTICAL SUBTRACTION OF IMAGES IN REAL TIME

[75] Inventors: Jan Grinberg, Los Angeles; Emanuel Marom, Pacific Palisades, both of Calif.

[73] Assignee: Hughes Aircraft Company, Culver City, Calif.

[21] Appl. No.: 808,941

[22] Filed: Jun. 22, 1977

[51] Int. Cl.² ............................................. G02F 1/13
[52] U.S. Cl. .................................... 350/342; 350/150; 350/347
[58] Field of Search .................... 350/150, 342, 347

[56] References Cited
U.S. PATENT DOCUMENTS

| | | | |
|---|---|---|---|
| 3,346,319 | 10/1967 | Billings | 350/150 |
| 3,614,191 | 10/1971 | Sagaguchi et al. | 350/150 X |
| 3,756,718 | 9/1973 | Letzer | 350/342 X |
| 4,018,509 | 4/1977 | Boswell et al. | 350/342 |

*Primary Examiner*—Edward S. Bauer
*Attorney, Agent, or Firm*—Donald C. Keaveney; W. H. MacAllister

[57] ABSTRACT

There is disclosed a system capable of subtracting in real time the intensities of two incoherently illuminated scenes and providing the sign of the subtracted information. The system utilizes two birefringent devices such as liquid crystal light valves, onto which the two images to be subtracted are projected. One valve is analyzed in between crossed polarizers, or equivalent, while the other one is in between parallel polarizers or equivalent. Both polarizer arrangements, for example, may be implemented with a polarizing beam splitter and a quarter wave plate. The common output image plane, onto which both images are superposed, displays an intensity proportional to the difference between the two inputs. This intensity "rides" on a constant background intensity thus displaying the difference signal as well as its polarity. The read-in and read-out beams could be coherent as well as incoherent, the latter being more desirable due to its speckle-free image. No other system is presently known which can perform incoherent subtraction. Experimental results obtained with incoherent illumination are given.

13 Claims, 3 Drawing Figures

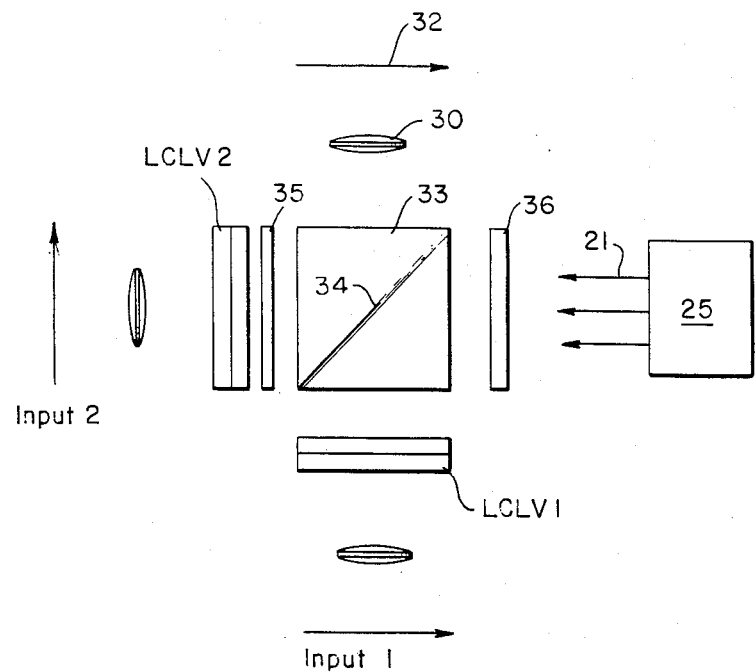

OPTICAL SUBTRACTION OF IMAGES IN REAL TIME

BACKGROUND OF THE DISCLOSURE

The subtraction of optical images has recently received growing interest due to the various disciplines interested in the extraction of the difference information between two images. Among the fields which may benefit from a reliable and easily interpretable subtraction method one finds earth resource studies, meteorology, area surveillance, medicine, aerial photography, microelectronics mask testing, etc.

The subtraction operation has been performed optically in the past, but most approaches (See Reference 1 of the References listed in Appendix II hereof) required several operations to be done sequentially, and very often an intermediate record had to be generated. This was sometimes a hologram on which information from the two images was properly recorded, (See References 2-6) and some other times a composite coded image (See References 7-13) from which the subtraction was later extracted by spatial filtering. Another approach has been the positive-negative superposition. See Reference 1.

In this latter technique two images to be subtracted are supplied to projection cathode ray tubes and one is inverted from positive to negative electrically by one of the tubes. The outputs are then optically superposed.

The techniques described in the literature do not fulfill all the requirements that a practical subtraction system should provide: large dynamic range, good signal-to-noise ratio (elimination of the common identical information), real time operation, speckle free image (utilization of spatially incoherent light).

It is an object of this invention to provide a system which overcomes these problems and does provide such a practical optical subtraction system.

SUMMARY OF THE INVENTION

In the following, the utilization of a system involving birefringent devices such as liquid crystal light valves (LCLV) (See References 14-18) for generating the subtraction of images will be presented. The system depends for its operation on the fact that optical transmission through such devices is a function of the square of the sine of the angle $\phi$ between the polarization of the incoming projection or readout beam and the projection of the optic axis of the birefringent material onto the entrance plane of the device. The system is applicable for both coherently or incoherently illuminated targets (real objects or transparency images as well) but the readout is done with initially incoherent light which is polarized, although coherent readout beams are not excluded. The entire operation is done in real time and has the added advantage that the sign of the subtraction is preserved, unlike any other known subtraction system. After the principle of operation of the light valves needed in our scheme is described, the system necessary for the subtraction operation will be presented, and experimental results will be shown and discussed.

BRIEF DESCRIPTION OF THE DRAWINGS AND APPENDICES

These and other features, objects, and advantages of the invention will be more fully apparent from the detailed description below taken in conjunction with the accompanying drawings and Appendices wherein like reference characters refer to like parts throughout and in which:

FIG. 1 is a diagrammatic view showing a cross-section of the layers of an AC liquid crystal light valve fabricated in accordance with teachings of U.S. Pat. No. 3,976,361 identified in Reference 17 of Appendix II below.

FIG. 3 is a diagrammatic view showing a system for the simultaneous formation of normal mode and complementary mode images on the output plane of the optical subtraction system of the present invention.

Appendix I sets forth the mathematical equation referred to in the specification. Appendix II is a numbered list of pertinent literature and patent references. Appendix III is a set of two groups of photographic exhibits illustrating experimental results obtained with the system of FIG. 3 and identified respectively as Plates 5798-1 and 5714-8; and one plate 5661-5 showing results of a prior art technique for comparison.

Plate 5798-1 contains five views of images to be processed by and images resulting from operation of the system of FIG. 3. Views $a$ and $b$ are subtracted to produce view $e$.

Plate 5661-5 is a view illustrating the result of subtraction of the same inputs $a$ and $b$ but performing the subtraction by conventional prior art halographic systems.

Plate 5714-8 shows in its top line views of two input transparencies providing images to be processed by the system. The views in the middle line show the complementary mode and the normal mode of the images produced by the light valve in the system of FIG. 3. The bottom line left shows the result of complete subtraction where the images are in registration and are superposed. The bottom line right shows the result of incomplete subtraction where the images are not in optimal registration prior to subtraction.

DETAILED DESCRIPTION OF THE INVENTION

The birefringent, light addressable liquid crystal light valve (See References 15-18) has been developed primarily for projection display systems. A hybrid field effect version of this device was later optimized for coherent optical data processing applications (See References 18 and 19). We will describe below the birefringent light valve that is utilized in the presently preferred embodiment of the optical image (coherent and incoherent) subtraction system.

It should first be pointed out, however, that for the purposes of this system there are a number of other birefringent devices which function equivalently to the light valve in the sense that the optical transmission through them is a function of $\sin^2 \bullet$ where $\bullet$ is the angle between the polarization of the incoming projection or readout beam and the projection of the optic axis of the birefringent material onto the entrance plane of the device. Such devices include, for example, KDP cells or a device commonly referred to as "PROM" for "Pockel's Readout Optical Modulator".

Figure 1:
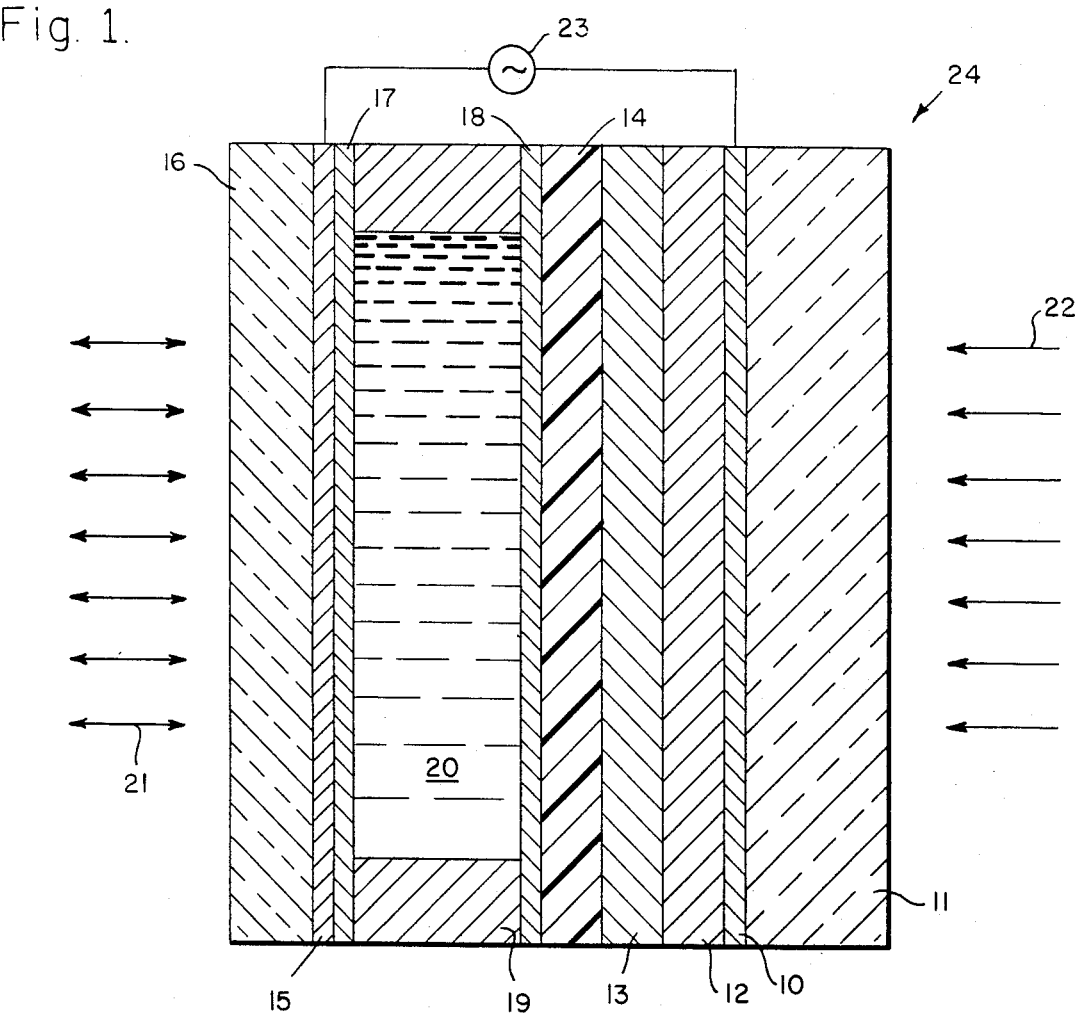

A cross-sectional schematic of the AC photoactivated light valve 24 used in the preferred embodiment is shown in FIG. 1. A transparent conductive coating 10 of indiumtin oxide is deposited on a glass or fiber optic substrate 11. This is followed by reactively sputtered (See References 17, 20, 21) CdS photosensitive film 12 of thickness 12-50 μm that has its maximum sensitivity at 525 nm. Next, a 2-μm-thick film 13 of CdTe, to block visible light, is deposited, followed by a broadband dielectric mirror 14 that consists of alternate high and low refractive index films of sputtered $TiO_2$ and $SiO_2$. The structure is completed with a transparent conductive counterelectrode 15 (overlayed with an inert $SiO_2$ film 17) opposite a similar film 18 on mirror 14. Counterelectrode 15 provides the other contact and is supported on glass plate 16. A spacer 19 provides thickness definition for the liquid-crystal layer 20.

In operation, the CdS photoconductor/photocapacitor acts as a high-resolution light controlled voltage gate for the liquid-crystal layer responsive to input signal light 22. The dielectric mirror serves to reflect the projection light 21, and the CdTe light blocking layer prevents residual projection light from reaching the photoconductor. Because of the high DC resistivity of the dielectric mirror, the device is operated with an AC voltage from source 23 impressed across the sandwich structure. This has the added benefit of extending the operating lifetime of the liquid crystal. The applied voltage varies from 5 to 50 $V_{rms}$, depending primarily on the voltage threshold of the liquid crystal. The operating frequency can be set in the range from 50 to $10^6$ Hz and is chosen to optimize the impedance match between the liquid crystal and the photoconductor/photocapacitor substrate.

Figure 2:
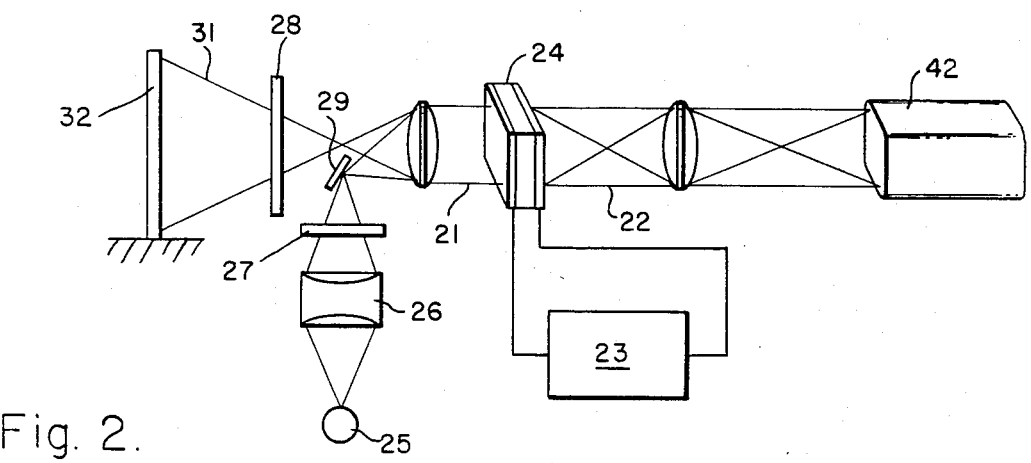
FIG. 2 is a diagramatic illustration of a simple optical system for the light valve of FIG. 1 showing both the input forming element to the right of the light valve and the output image forming elements to the left of the light valve.

A simple optical system for single image projection is shown in FIG. 2. The light from the projection lamp 25 is collimated by lens 26 polarized by polarizer 27, then directed to the cell 24 by mirror 29 and lens 30. The light passes through the liquid crystal and is reflected from the dielectric mirror. The second polarizer 28 (which is crossed with respect to the first) is placed in the projection (readout) beam 21 that is reflected from the light valve. The readout operation principle is described in the following. The liquid crystal 20 is aligned with its optical axis nearly perpendicular to the device electrodes 10 and 15 so that, in the off-state, no phase retardation occurs and the projection light is blocked from the screen by the crossed polarizers. With imaging light 22 from image source 42 incident on the photoconductor 12, a voltage above the field-effect threshold is switched onto the liquid-crystal layer. Image source 42 may be an illuminated transparency, a cathode ray tube, or the like. Since the liquid crystal chosen has negative dielectric anisotropy, i.e. $\epsilon_\perp > \epsilon_\parallel$, its molecules tend to align normal to an applied electric field. Thus, the applied voltage, which changes in proportion to the spatial intensity variation of the input imaging light, rotates the molecules from their initial state parallel to the field and introduces a phase retardation between the ordinary and extraordinary rays. This phase retardation changes the polarization of the projection light 21. If the liquid crystal layer is thin enough, the retardation and therefore the dispersion effect are small (See Reference 15). As a result, a white-gray scale image is projected onto the screen 32 by analyzed beam 31.

The light transmission through the birefringent light valve placed in between crossed polarizers (normal mode) is given by the relation of Equation (1) in Appendix I hereof and if placed in between parallel polarizers (complementary mode) it is given by Equation (2) therein. Equations (1)-(5) describe the nonlinear response relationship between the intensity (I) of light 22 impinging on the liquid crystal cell and that detected at projection screen 32 for the readout beam ($T_c$ or $T_p$) where reference is to the portion 31 of the readout beam passed through polarizer 28.

For the purpose of this discussion, it will be sufficient to use the first Equations (1)-(2) without spelling out the exact dependence on the incident radiation (Equations (3)-(5)).

The retardation function F(I) has been explicitly given in terms of $\theta_m$, so that one could compare that value with the one approximated in the literature (See Reference 22).

SUBTRACTION USING LIQUID CRYSTAL LIGHT VALVES

The conventional or normal way of operating a liquid crystal light valve is to place it in between crossed polarizers such as 27-28 of FIG. 2. Equation 1 defines this mode. For input light intensities near the threshold value, one has S → 1. This provides $\theta_m \to 0°$, $E(0°)/K(0°) = 1$ and F(I) = 0, so that no light output is obtained for the crossed polarizer case (normal mode — Equation 1) and maximum output for parallel polarizers (complementary mode — Equation 2).

Although the dependence of the output intensity (Equations (1) and (2)), is a highly nonlinear function of the input intensity, it is interesting to note that the sum of these two functions is always a constant, independent of the incident radiation level as well as of the nonlinearity involved.

For the positive-negative superposition technique (Reference 1), this constant sum is only true for a theoretically perfect linear system. In practice, usable systems are in fact nonlinear and hence introduce inaccuracies.

This feature of the present system may be seen by adding the two equations (1) and (2) and noting that the resulting factor of the form ($sin^2 + cos^2$) is identically equal to 1 by elementary trigonometry as seen in Equation (6). From Equation (6) it is seen that since $2\theta$ is not dependent on signal or intensity, the total transmission $T_c + T_p$ will be constant when the two signal intensities are equal to each other at any absolute value. A difference between the two input levels results in a deviation from this constant value which is purely a measure of their difference independently of their absolute values.

This is the basis of the concept of the subtraction system shown in FIG. 3. Let's have two identical objects, each imaged on a light valve. Thus, INPUT-1 is imaged on LCLV-1 and INPUT-2 is imaged on LCLV-2. If one valve is read in a normal mode and the second one in a complementary mode, and both images are superposed in registration on the common plane of a display screen 32, the composite image is of constant spatial intensity. On the other hand, if one of the inputs slightly differs from the other one, the local differences are observable in the output plane 32 as changes in the constant background level. It is interesting to realize that since the output image is composed of two orthogonally polarized illuminations, the readout is possible with either a coherent or incoherent beam. The capability of operation with incoherent light is unique to this system.

We are now therefore going to analyze the response of a system such as shown in FIG. 3 composed of two valves, one — LCLV-1— being read out in a normal mode and the second one — LCLV-2— in a complementary mode. The valves are addressed respectively by the two input functions, which are imaged in registration on the output plane.

It will, of course, be obvious that one could generate the two modes by using two systems of the type shown in FIG. 2, one with crossed polarizers and one with parallel polarizers, and superposing their outputs. But one can also compactly generate the two imaging modes with the system of FIG. 3 which indicates that an incoherent readout beam 21 impinges upon the valves through the intermediary of a polarizing beam splitter 33. The polarizing beam splitter 33 is preferably of the type described by MacNeil (See Reference 24). This device, at the interface 34 of its two prisms polarizes incoming light 21 and reflects the (s) component to LCLV-1 and transmits the orthogonal (p) component to LCLV-2, thus combining several of the discrete elements of FIG. 2. Thus, following the ray approaching LCLV-1, an s-polarized beam impinges upon the valve, but only the p-polarized components generated by valve action due to input image illuminated points on LCLV-1 pass towards the output image plane. Therefore, LCLV-1 is operated in a normal mode and its response is given by Equation (1).

On the other hand the p-polarized light directed towards LCLV-2 passes twice through the quarter wave optical plate 35, once before the reflection from the valve thus generating a positive circularly polarized wave, and then again after the reflection from the valve transforming the negative circularly polarized wave into an s-polarized beam. The addition of the λ/4 plate thus adds a retardation of π/2, generating the equivalency of parallel polarized readout as set forth in Equation (7). Since the readout beams are incoherent, or coherent but of orthogonal polarizations, the output plane intensity will be the summation of these distributions, as given by Equation (8). For $I_1 = I_2$, one gets $I_{out}$ = Const, as indicated earlier. Let's analyze now the case of the two inputs differing from one another as given in Equation (9).

Upon substituting Equation (9) into Equation (8) and expanding the argument of $sin^2$ into a series of increased powers of δ, one obtains Equation (10).

Inspection of Equation (10) reveals the main feature of this system to be:

(a) Equal intensity points in the two input images appear of uniform intensity A, independent of the signal level;

(b) Output is linear (to the first approximation) with the signal difference;

(c) The difference signal δ preserves its polarity. Thus, at a point for which $I_1 < I_2$, the output level decreases below the uniform intensity A;

(d) The dynamic range (as a consequence of (a)) of the input imagery is very large, however the contrast of the subtracted image is limited due to the uniform constant background present.

The technique described in this section has therefore the capability of displaying the superposition of two images and identifies the location of the difference in imagery by an increase or a decrease in the average intensity level.

EXPERIMENTAL RESULTS

The incoherent addition of two intensity functions, one a normal mode representation of one of the inputs, and the second a complementary mode representation of the second input, has been tried with a system identical to the one shown diagrammatically in FIGS. 1 and 3. The illumination sources 25 and 42 consisted of microscope incandescent light bulbs for both the input illumination of transparencies as INPUT-1 and INPUT-2 respectively, as well as for the readout beam source 25. In order to have accurate control of the polarization rotation introduced by the quarter wave plate 35, a Corning color filter 36 was inserted in front of the readout beam 21 restricting the illumination bandwidth.

Red filters in conjunction with λ/4 plate centered at λ = 633 nm — (HeNe line) as well as green filters (for a λ/4 plate centered at λ = 546 nm — Hg line) were successfully utilized, providing similar results.

As inputs, we used two transparencies of a line pattern seen in views a and b of Plate 5798-1 Appendix III. The first was placed in the position of INPUT-2 thus exhibiting the complementary mode output (view c) while the second was placed in the conventional normal mode configuration (view d). Their superposition provided the "subtraction display" exhibited in view e.

The two liquid crystal valves LCLV-1 and LCLV-2 were two experimental valves of the same type but of some fine differences. Both were connected to signal generators providing an AC voltage in the range of 15–20 $V_{rms}$ and at a frequency of 500–1000 Hz. The two images have been brought in registration on the output plane 32 and the voltages slightly adjusted for the best intensity uniformity. The valves were not uniform over their entire area and thus no complete field uniformity was achieved. However, the areas of uniformity clearly establish the principles set forth herein.

It may be instructive to compare the results obtained utilizing this method with those obtainable in a conventional subtraction (multistep) system. The same two input transparencies have been earlier utilized in a holographic subtraction setup. Two Fourier transform holograms of the inputs were recorded, while a π phase shift was introduced between the two sets (See Reference 23). The reconstruction displayed the difference information (Plate 5661-5 of Appendix III) which as expected does not preserve the sign of the difference in the image content. The sign is, however, present in the incoherently superposed signal produced by the present invention.

A different object used with the setup described herein was the group of letters displayed in Plate 5714-8. The top row, shows the two inputs, the central row shows the normal and the complementary modes respectively, as they appear on the output plane and finally their superposition in the lower row. At left, the images have been placed in registration. The incomplete cancellation of the lower parts of H and R resulted from distorted imagery and non-uniform field intensity. The L is clearly blacker than the H or R. At right one sees the superposition for imperfect registration. The viewer observing the image while making the registration alignment has a 3-dimensional relief impression while observing the output plane. When the images approach registration, the 3-D effect fades, and thus helps in the alignment process.

The system described herein allows easy observation of the subtraction display while making alignment adjustments. During alignment, one does not only place the two inputs in mutual registration, but one can also change uniformly the scale of any image, if necessary, by varying the optical magnification of its imaging system.

CONCLUSIONS

One might be tempted to regard the incoherent addition of the normal and complementary modes as being the equivalent of the positive-negative superposition technique summarized in a review of existing subtraction techniques, (See Reference 1). There are, however, some distinct differences; while the positive-negative superposition of the prior art is essentially a multiplication of two functions (corresponding to subtraction only for binary images), the incoherent addition described herein is a true intensity addition which is able to extract differences from image points of any signal level.

A major advantage of the system described herein is that for identical inputs the normal mode, as well as the complementary mode, are activated at the same operating point, thus providing complete independence of the non-linear characteristics of the device for any signal level. On the other hand the known phase reversal (positive-negative superposition) conventional systems are based on using the respective device (CRT's, etc.) at two different operating points, thus providing a signal leveldependent operation, limiting the usefulness of the system as a good subtraction device.

The added advantage of birefringent devices such as liquid crystal light valves is that they can be operated by either coherent or incoherent light for either illumination of inputs or read-out or both. The incoherent operation is of greater interest since it can be addressed by either transilluminated targets (transparencies) or self luminous objects (CRT, etc.) extending the range of possible applications of the described scheme. Moreover, the incoherent read-out provides a speckle free image. If one desires to eliminate the constant background, it is possible to use a closed circuit TV monitor to pick up the image, differentiate it electronically and display only the difference. By doing that, however, the sign of the difference signal will be lost. One could eliminate the constant background also by spatial filtering, an operation that can be done simultaneously in real time too, using a liquid crystal incoherent to coherent converter (See Reference 9). The additional LCLV will be addressed by the composite image and the coherent read-out should contain a DC stop in the Fourier plane. If a coherent readout is utilized, the background subtraction can be done directly by blocking the DC in the Fourier plane of the output imaging lens, thus not requiring an additional liquid crystal light valve.

It seems, however, that the primary advantage of obtaining in real time the subtraction of images using exclusively incoherent sources, and providing at the same time the sign of the resulting signal, are the attractive features of the system described herein.

APPENDIX I — EQUATIONS $$T_c = \sin^2 2\phi \sin^2[F(I)] \tag{1}$$

$$T_p = \sin^2 2\phi \cos^2[F(I)] \tag{2}$$

where $$F(I) = 2\pi/\lambda \, d \, (\Delta n)_{max} [1 - (E(\sin \theta_m)/K(\sin \theta_m))] \tag{3}$$

and $$K(\sin \theta_m) = (\pi/2) \, S \tag{4}$$

$$S = V(I)/V_{th} \tag{5}$$

The notation used in these relations is given below.

$\phi$ the angle between the polarization of the incoming beam and the projection of the liquid crystal optic axis onto the entrance plane.

$d$ thickness of the liquid crystal layer.

$\lambda$ wavelength of the readout light.

$(\Delta n)_{max}$ macroscopic anisotropy of the index of refraction of the liquid crystal $(n_e-n_o)$.

$K(\sin \theta_m)$ complete elliptic integral of first kind.

$E(\sin \theta_m)$ complete elliptic integral of second kind.

$V(I)$ voltage across the liquid crystal (function of input light intensity).

$V_{th}$ threshold voltage for LCLV activation.

$S$ switching ratio.

$\theta_m$ maximum angle between the liquid crystal optic axis and the direction of propagation of the incident light.

$$T_c + T_p = \sin^2 2\phi \, (\sin^2[F(I)] + \cos^2[F(I)]) \, T_c + T_p$$
$$= \sin^2 2\phi \tag{6}$$

$$T_p = A \sin^2[F(I_2) + \pi/2] = A \cos^2[F(I_2)] \tag{7}$$

$$I_{out} = A[\sin^2 F(I_1) + \cos^2 F(I_2)] \tag{8}$$

$$I_1(x,y) = I_2(x,y) + \delta(x,y) \tag{9}$$

$$I_{out}(\delta) = A\{1 + \delta F'(I_2)\sin 2F(I_2) + \delta^2[F'^2(I_2)\cos 2F(I_2) + \tfrac{1}{2} F''(I_2)\sin 2F(I_2)] + \ldots\} \tag{10}$$

APPENDIX II — REFERENCES

1. J. F. Ebersole, Opt. Engineer. 14, 436 (1975).
2. G. W. Stroke, "An Introduction to Coherent Optics and Holography" (Academic Press, N.Y., 1969.
3. S. Lowenthal and J. Braat, Appl. Opt. 10, 2553 (1971).
4. E. Marom, Opt. Commun. 6, 86 (1972).
5. K. Bromley, M. A. Monohan, J. F. Bryant, and B. J. Thompson, Appl. Opt. 10, 174 (1971).
6. K. Matsuda, N. Takeya, J. Tsujiuchi and M. Shinoda, Opt. Commun. 2, 425 (1971).
7. K. S. Pennington, P. M. Will and G. L. Shelton, Opt. Commun. 2, 113 (1970).
8. K. Patorski, S. Yokozoki and T. Suzuki, Nouv. Rev. Optique 6, 25 (1975).
9. Y. Belvaux, S. Lowenthal and T. Saimi, Opt. Commun. 5, 143 (1972).
10. Y. Belvaux and S. Lowenthal, "Space Optics" Proc. of 9th Congress of ICO, 1972.
11. S. Debrus, M. Francon and C. P. Grover, Opt. Commun. 6, 1972 (1971).
12. S. Debrus, M. Francon and P. Koulev, Nouv. Rev. Optique 5, 153 (1974).
13. N. Konforti and E. Marom, Proc. of Int'l. Conf. on "Applications of Holography and Optical Data Processing" — Israel (Pergamon Press 1977).
14. A. Jacobson, J. Grinberg, W. Bleha, L. Miller, L. Fraas, G. Myer, and D. Boswell, Annals of N.Y. Acad. Sciences 267, 417 (1976).
15. J. Grinberg, W. P. Bleha, A. D. Jacobson, A. M. Lackner, G. D. Myer, L. J. Miller, J. D. Margerum, L. M. Fraas, and D. D. Boswell, "Photoactivated Birefringent Liquid Crystal Light Valve for Color Symbology Display," IEEE Trans. on Elec. Dev., Vol. ED 22, pp 775–783 (1975).
16. U.S. Pat. No. 3,824,002 issued to T. D. Beard, July 16, 1974.
17. U.S. Pat. 3,976,361 issued to L. M. Fraas et al, Aug. 24, 1976.
18. U.S. Pat. No. 4,019,807 issued to D. D. Boswell et al, Apr. 26, 1977.
19. J. Grinberg, A. Jacobson, W. Bleha, L. Miller, L. Fraas, D. Boswell, G. Myer, "A New Real-Time Non-Coherent to Coherent Light Image Converter", Opt. Eng. Vol. 14, pp. 217–225 (1975).
20. L. M. Fraas, J. Grinberg, W. P. Bleha and A. D. Jacobson, "Novel Charge-Storage-Diode Structure for use with Light-Activated Displays," J. Appl. Phys., Vol. 47, pp. 576–583 (1976).
21. L. M. Fraas, W. P. Bleha, J. Grinbert and A. D. Jacobson, "AC Photoresponse of a Large Area Imaging CdS/CdTe Heterojunction," J. Appl. Phys. Vol. 47, pp. 584–590 (1976).
22. M. F. Schiekel and K. Fahrenschon, Appl. Phys. Lett. 19, 391 (1971).
23. E. Marom and N. Konforti, Opt. Commun., Vol. 21, p. 63 (1977).
24. U.S. Pat. No. 2,403,731, issued to S. M. MacNeille, July 9, 1946.

APPENDIX III — RESULTS

The following photographic plates 5798-1 and 5714-8 as identified above are exhibits which show the experimental result of using the system of FIGS. 1 and 3 in the manner described in the specification compared with the result shown in Plate 5661-5 of using a prior art system.

What is claimed is:

1. A system for optical subtraction of two images comprising:
    (a) means for superposing a normal function of the spatial intensity distribution of one of said images on a complementary function of the spatial intensity distribution of the other of said images to produce a resulting image which displays both the sign and magnitude of the difference of the spatial intensity distributions of said images;
    (b) said normal function having the optical characteristics of a polarized light image modulated by a birefringent modulating device positioned between crossed polarizers; and
    (c) said complementary function having the optical characteristics of a polarized light image modulated by a birefringent modulating device positioned between parallel polarizers.

2. A system for optical subtraction of images comprising:
    (a) first and second reflective birefringent display devices, each of said devices having input image activation means responsive to input image signals for modulating the polarization of output light images projected from said devices;
    (b) means to provide projection light to each of said devices; and
    (c) optical means for superposing the respective output images from said devices on a common display plane, said optical means including means for effectively placing one of said devices between crossed polarizers and means for effectively placing the other of said devices between parallel polarizers.

3. A system as in claim 2 wherein each of said birefringent display devices is a liquid crystal light valve.

4. A system for optical subtraction of images as in claim 3 wherein said optical means comprises:
    (a) a polarizing beam splitter positioned with respect to said light valves and with respect to said means to provide projection light to receive either coherent or incoherent projection light and to divide said light into two beams orthogonally polarized with respect to each other, one of said beams being directed to the first of said liquid crystal light valves and the other of said beams being directed to the other of said liquid crystal light valves;
    (b) a quarter wave plate interposed between said polarizing beam splitter and one of said liquid crystal light valves; and
    (c) projection lens means for imaging superposed output images from said first and second liquid crystal light valves reflected back through said polarizing beam splitter and said lens means onto a common output image plane to display an intensity proportional to the difference between the intensities of the two input images at any given pair of spatially corresponding points in said input images.

5. A system as in claim 4 and further including a bandpass filter positioned between said means to provide projection light and said polarizing beam splitter.

6. A system as in claim 3 wherein the frequency response of said light valve is sufficient to permit real time operation of said system.

7. A system as in claim 3 wherein said superposed output images produce an image on said common display plane which displays both the magnitude and the sign of the difference between said output images.

8. A system as in claim 2 wherein said input image light is incoherent.

9. A system as in claim 2 wherein said input image light is coherent.

10. A system as in claim 2 wherein said projection light is incoherent.

11. A system as in claim 2 wherein said projection light is coherent.

12. A system for optical subtraction of images comprising:
    (a) polarizing beam splitter means for dividing light into two beams orthogonally polarized with respect to each other;
    (b) first and second reflection birefringent modulating devices positioned to receive said orthogonally polarized beams from said beam splitter means and to modulate and reflect said beam back to said beam splitter means;
    (c) a quarter wave plate positioned between one of said reflection birefringent devices and said beam splitter means; and
    (d) projection lens means for superposing and projecting said modulated images reflected back to said beam splitter means.

13. A system as in claim 12 and further including:
    (e) bandpass filter means positioned in front of the input plane to said beam splitter means.

* * * * *